(12) United States Patent  
Scherzinger et al.

(10) Patent No.: US 8,315,022 B2  
(45) Date of Patent: Nov. 20, 2012

(54) INTEGRAL CURRENT TRANSFORMER SHUNT RESISTOR

(75) Inventors: William Scherzinger, Oro Valley, AZ (US); Michael Duddeck, Tucson, AZ (US); Dwayne E. Burnett, Tucson, AZ (US); David Hodge, Oro Valley, AZ (US); Robert Cisneroz, Oro Valley, AZ (US)

(73) Assignee: Honeywell International Inc., Morristown, NJ (US)

( * ) Notice: Subject to any disclaimer, the term of this patent is extended or adjusted under 35 U.S.C. 154(b) by 378 days.

(21) Appl. No.: 12/755,216

(22) Filed: Apr. 6, 2010

(65) Prior Publication Data

US 2011/0242710 A1    Oct. 6, 2011

(51) Int. Cl.  
*H02H 7/04* (2006.01)
(52) U.S. Cl. ............................................ 361/38; 361/36
(58) Field of Classification Search .................... 361/38, 361/36  
See application file for complete search history.

(56) References Cited

U.S. PATENT DOCUMENTS

| | | | | |
|---|---|---|---|---|
| 3,101,466 A | * | 8/1963 | Armstrong | 338/273 |
| 3,795,046 A | * | 3/1974 | Shirn | 29/618 |
| 5,594,285 A | * | 1/1997 | Wisbey et al. | 307/18 |
| 6,226,600 B1 | * | 5/2001 | Rodenberg et al. | 702/61 |
| 6,288,625 B1 | | 9/2001 | Kaczowski | |

FOREIGN PATENT DOCUMENTS

GB    244807    12/1925

* cited by examiner

*Primary Examiner* — Jared Fureman  
*Assistant Examiner* — Scott Bauer  
(74) *Attorney, Agent, or Firm* — Shimokaji & Assoc., PC

(57) ABSTRACT

An electrical power system may comprise a power source, an electrical load and an interconnection path between the power source and the electrical load. At least one power-source current transformer may be positioned at the power source. At least one remote current transformer may be positioned remotely from the power-source current transformer so that a portion of the interconnection path is between the power-source and the remote current transformer. A control circuit may be interposed between the power-source and remote current transformers and may be responsive to current imbalance between the power-source and remote current transformers to disconnect the power source from the electrical load in the event of such imbalance. The at least one power-source current transformer may comprise a secondary winding having first and second ends, and a resistor connected across the first and second ends. This resistor may provide a path for current transformer secondary current to flow in the event of an open circuit failure in the control circuit or the interconnection path between the current transformer and the control circuit. Consequently voltage across the current transformer secondary may be limited to a level that will not damage the secondary windings. The control circuit may detect the open circuit failure and act to isolate the power source from the load with the minimum of time delay. The current transformer is thereby protected from open circuit failures.

17 Claims, 6 Drawing Sheets

INTEGRAL CURRENT TRANSFORMER SHUNT RESISTOR

BACKGROUND OF THE INVENTION

The present invention generally relates to electrical systems which employ current transformers. More particularly the present invention relates to current transformers employed as circuit protection devices.

In some electrical distribution systems a zone protection system may be used to assure that electrical failures of a portion of a system may be isolated. For example, in an aircraft a protection zone or fault zone may be established between a generator and one or more electrical loads that may receive current from the generator. In a typical three-phase system, first current transformers may be placed around output conductors at the generator. Second current transformers may be placed on the conductors at a position remote from the generator. A monitoring system may detect any current imbalance between the first and second current transformers if and when a fault may develop in a zone between the first and second current transformers.

Secondary windings of the current transformers may be interconnected to a control circuit which may operate disconnection contactors in the event of a fault. In this context, the secondary windings may be considered to be connected to a load with low impedance. The current transformer design and the impedance of the control circuit may be selected so that, in normal operation, the voltage developed across the secondary windings does not exceed insulation breakdown limits of the secondary windings.

It is possible that a so-called "open circuit" failure may occur in the control circuit or in an interconnection path between one of the current transformers and the control circuit. In such an event, the impedance across the secondary winding may become infinite. Continued passage of current from the generator to the electrical loads may then produce extremely high voltages across the secondary winding. As a result of such high voltages, insulation in the secondary winding may break down and the current transformer may become inoperative.

In a typical aircraft generator, current transformers may be incorporated directly in the generator. Consequently, failure of one of the current transformers in the generator may result in a requirement to remove the generator from the aircraft to replace the defective current transformer.

As can be seen, there is a need to provide protection of current transformers from damage resulting from open circuit failures in a control circuit to which the secondary winding of the current transformer may be connected. Additionally, there is a need to avoid a need to remove and repair an aircraft generator in the event of such an open failure.

SUMMARY OF THE INVENTION

In one aspect of the present invention, an electrical power system may comprise an interconnection path between a power source and an electrical load. At least one power-source current transformer may be positioned at the power source. At least one remote current transformer may be positioned remotely from the power-source current transformer so that a portion of the interconnection path is between the power-source and the remote current transformer. A control circuit may be interposed between the power-source and remote current transformers and may be responsive to current imbalances between the power-source and remote current transformers to disconnect the power source from the electrical load in the event of such imbalances. The at least one power-source current transformer may comprise a secondary winding having first and second ends, and a resistor connected across the first and second ends.

In another aspect of the present invention, a current transformer may comprise a secondary winding having a first end and a second end and a resistor electrically interconnected across the first end and the second end of the secondary winding.

In still another aspect of the present invention, a method for operating an electrical power system may comprise the steps of: passing electrical power from a power source to electrical loads through at least one power-source current transformer; monitoring current from the power-source current transformer with a control circuit; and passing current from a secondary winding of the current transformer through a shunt resistor in the event of an open circuit fault in the control circuit.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide power systems in which shunt resistors may be incorporated directly on a current transformer. The shunt resistor may be connected across terminals of a secondary winding of the current transformer. Presence of the shunt resistor may preclude development of infinite impedance across the terminals of the secondary winding if and when an open circuit failure may occur in a control circuit that is connected to the current transformer.

Figure 1:
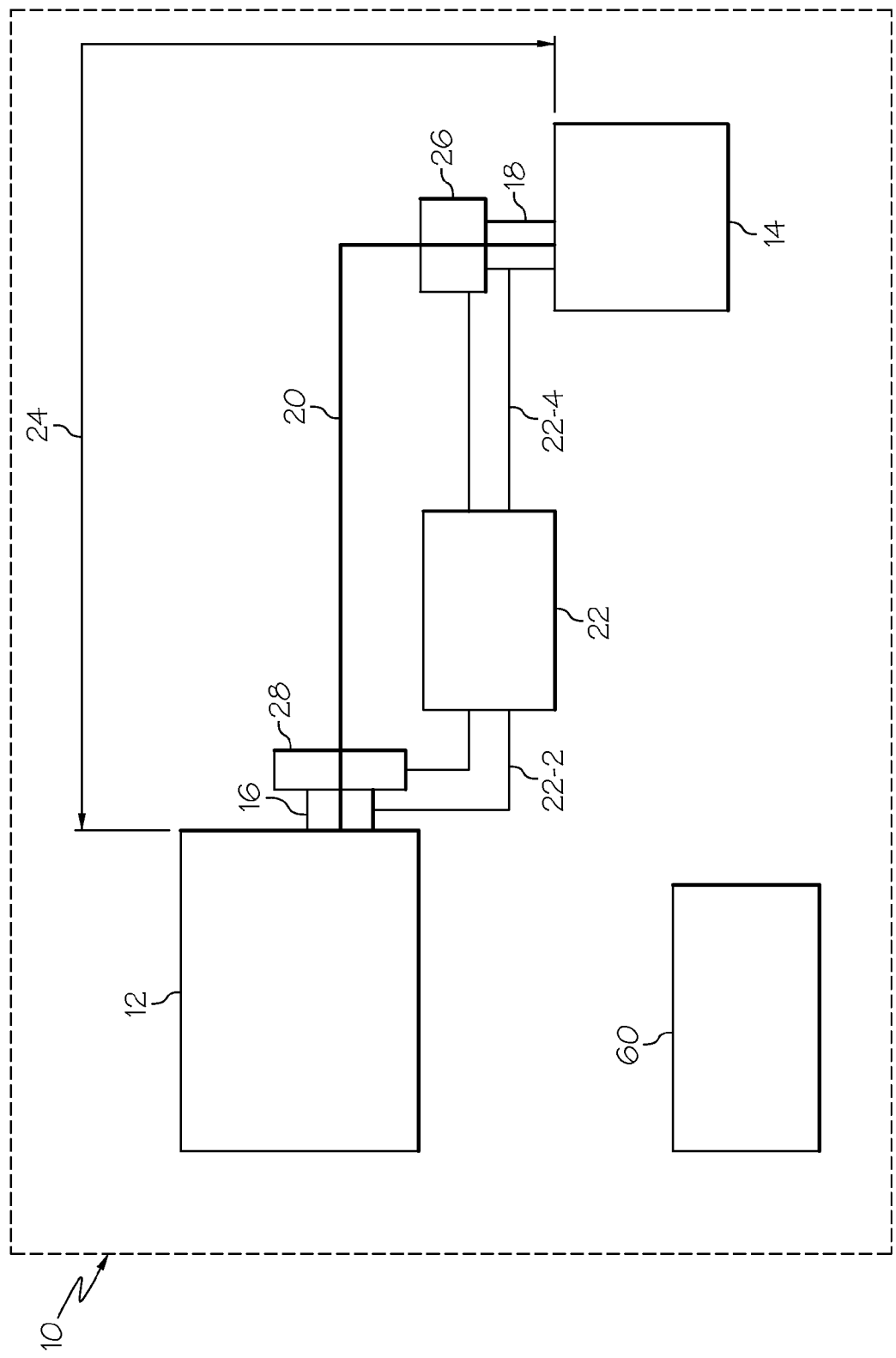
FIG. 1 is a block diagram of an electrical power system in accordance with an embodiment of the invention.

More particularly, embodiments of the present invention may provide power systems with generators with integral, shunt-resistor-protected current transformers. Such generators may not require repair or replacement in the event of an open failure across the terminals of the secondary winding of their integral current transformers Referring now to FIG. 1, a block diagram may illustrate an exemplary embodiment of an electrical power system 10. The power system 10 may be, for example, a portion of a vehicular power system such as an aircraft power system. The power system 10 may comprise a power source 12 connected to electrical loads 14 through an interconnection path 20. In the case of a vehicular or aircraft power system the power source may be an electric machine such as a generator or starter generator. The power system 10 may be a single phase system or a multi-phase system. For purposes of simplicity, the interconnection path 20 is shown in FIG. 1 as a single conductor. It is to be understood however that in the case of, for example, a three phase system the interconnection path 20 may comprise three conductors.

The power system 10 may further comprise a current transformer 16 positioned at or near the power source 12 and a current transformer 18 at or near the electrical loads 14. The current transformers at or near the power source 12 may be referred to as power-source current transformers 16. The current transformers at or near the electrical loads 14 may be referred to as remote current transformers 18. Portions of the interconnection path 20 between the power-source current transformers 16 and the remote current transformers 18 may be referred to as a protected zone 24.

Figure 2:
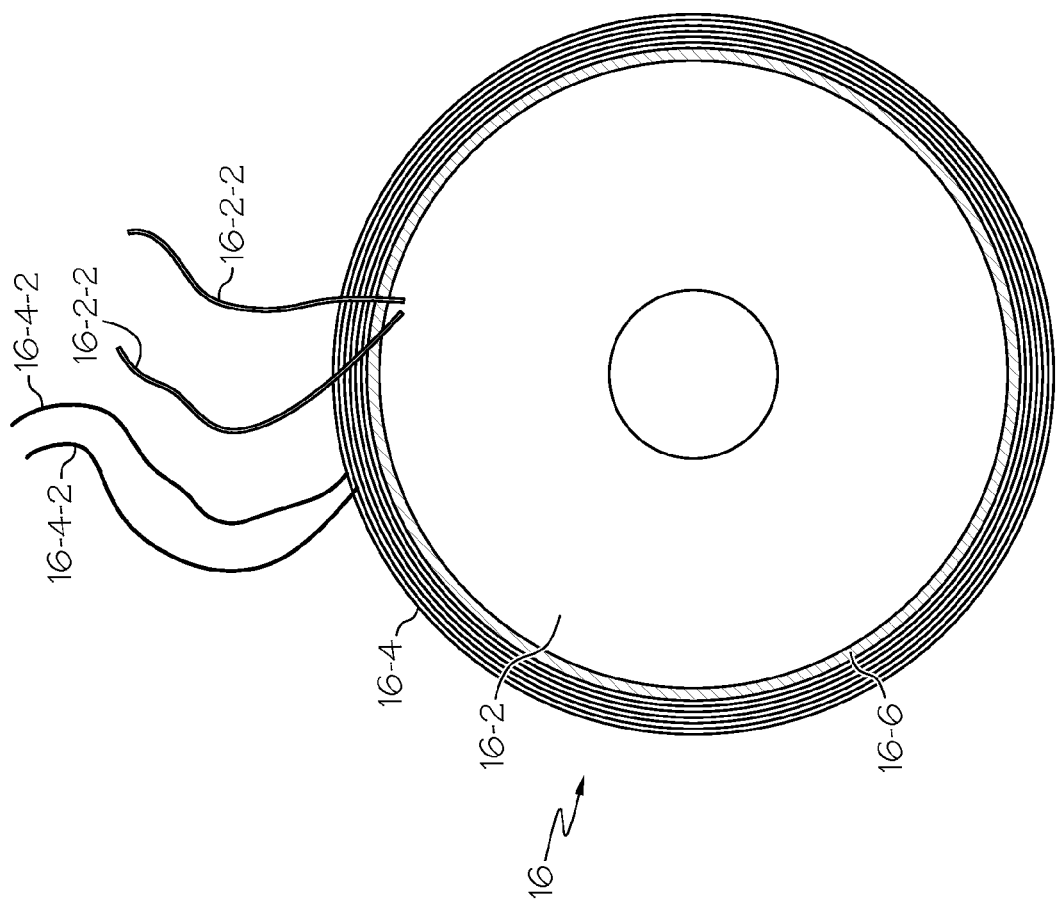
FIG. 2 is an elevation view of a current transformer in accordance with an embodiment of the invention.

Referring now to FIG. 2, one of the current transformers 16 may be illustrated. It may be seen that the current transformers 16 may be a toroid with a configuration that may result from a continuous insulated wire being wound into the toroidal shape. While not illustrated in detail, it may be noted that the current transformer 18 may have the same configuration as the current transformer 16. As may be seen in FIG. 1, the current transformers 16 and 18 may be positioned in the power system 10 so that their respective toroids may be secondary windings, e.g., 16-2. The current transformers 16 and 18 may be positioned to surround the interconnection path 20 so that the interconnection path 20 comprises a primary of each of the transformers 16 and 18.

Referring now to FIGS. 1 and 2, it may be seen that the current transformer 16 may have connection leads 16-2-2. The connection leads 16-2-2 may be interconnected to a control circuit 22 on a connection path 22-2. Similarly, the current transformer 18 may be interconnected to the control circuit 22 on a connection path 22-4. As current passes through the interconnection path 20, the secondary winding 16-2 of the current transformer 16 may develop a current that may be proportional to the current in path 20. The current transformer 18 may develop a similar current. The control circuit 22 may monitor and compare the currents of both of the current transformers 16 and 18. If current in one of the current transformers, e.g., the current transformer 18, becomes lower than that of the current transformer 16, the control circuit 22 may treat this condition as indicative of a short to ground in the interconnection path 20. In such an event, the control circuit may activate one or both of contactors 26 and/or 28 so that protected zone 24 may be isolated from ground. Similarly, phase-to-phase faults may also be isolated.

Under some circumstances, the control circuit 22 and/or its connection paths 22-2 and/or 22-4 may develop an open circuit fault. It may also be the case that current continues to flow in the interconnection path 20. Under these conditions, extremely high voltages may develop in the secondary winding of the current transformer 16 or 18. Such high resultant voltages, in the order of Kilovolts, may damage insulation within the current transformer 16 or 18 and cause failure of the current transformer.

Figure 3:
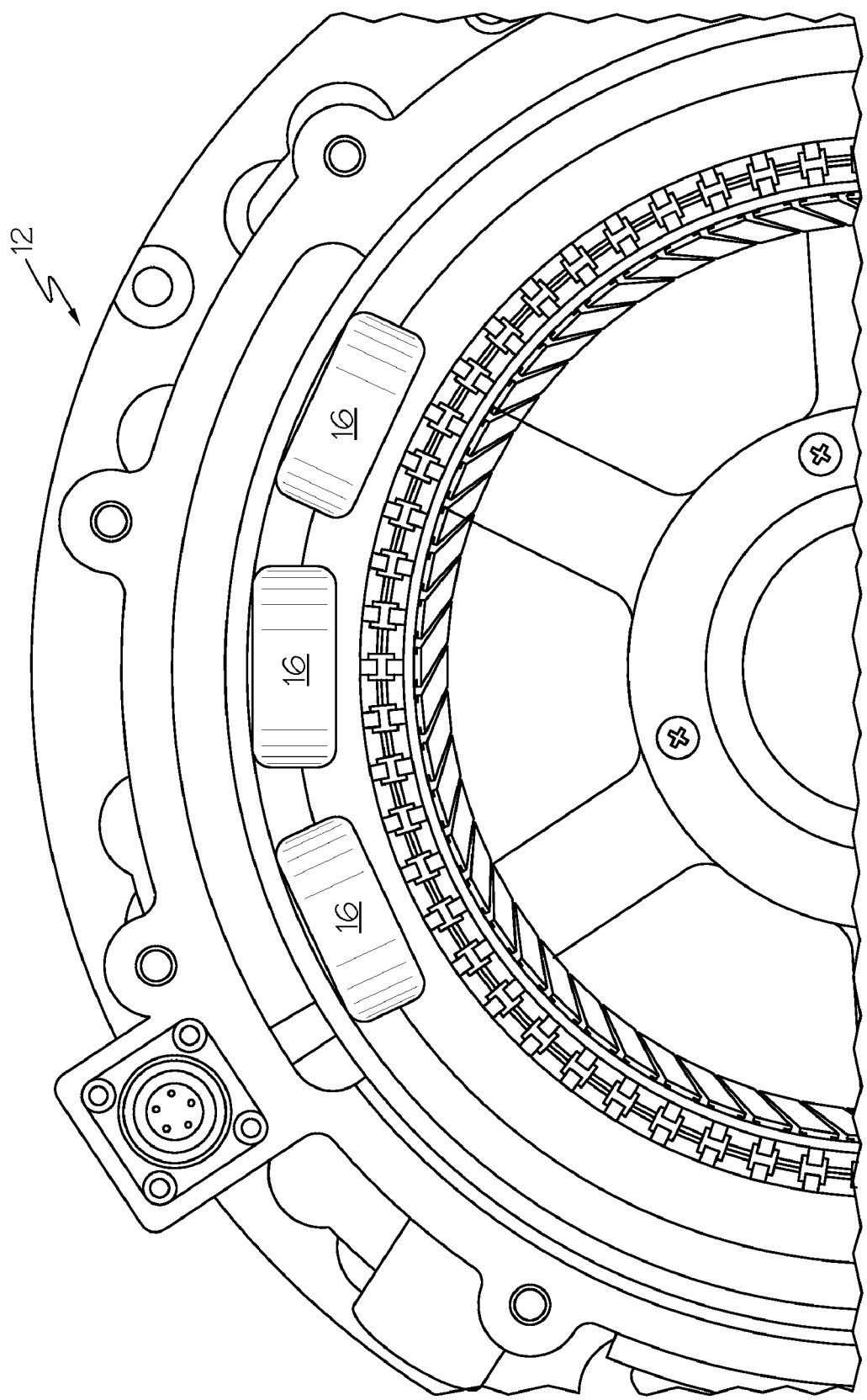
FIG. 3 is partial sectional view of a generator in accordance with an embodiment of the invention.
Figure 4:
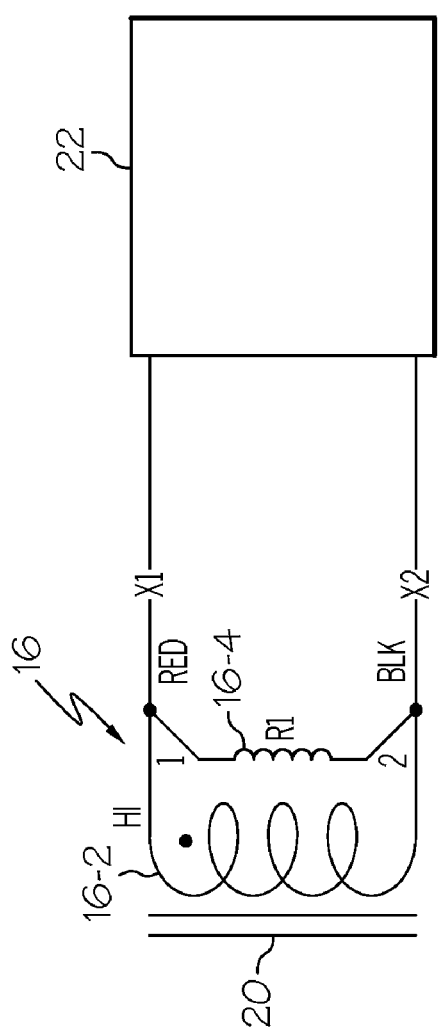
FIG. 4 is an electrical circuit diagram of a current transformer in accordance with an embodiment of the invention.

Referring now to FIG. 3, it may be seen that failure of one of the power-source current transformers 16 may have additional consequences. As may be seen in FIG. 3, the power source 12 may be a three-phase generator in a vehicle such as an aircraft (not shown). The current transformers 16 may be integral with the generator. Failure of one or more of the current transformers 16 may result in a requirement to remove the generator from the aircraft and repair it Referring now to FIGS. 4 and 5 and back to FIG. 2, an exemplary embodiment of a protection system for the current transformers 16 and/or 18 may be seen. FIG. 4 may illustrate a shunt resistor 16-4 connected across the secondary winding 16-2 of the current transformer 16. In normal operation, the secondary winding 16-2 and the control circuit 22 may be interconnected in a continuous loop so that the secondary winding 16-2 is presented with finite impedance. In the event of an open fault, the control circuit 22 may no longer present finite impedance to the secondary winding 16-2. However, the shunt resistor 16-4 may continue to present finite impedance to the secondary winding 16-2 even if an open fault develops between the current transformer 16 and the control circuit 22. Thus, even though current may continue flowing through the interconnection path 20, voltage across the secondary winding may not rise to a level that may damage insulation in the current transformer 16.

Figure 5:
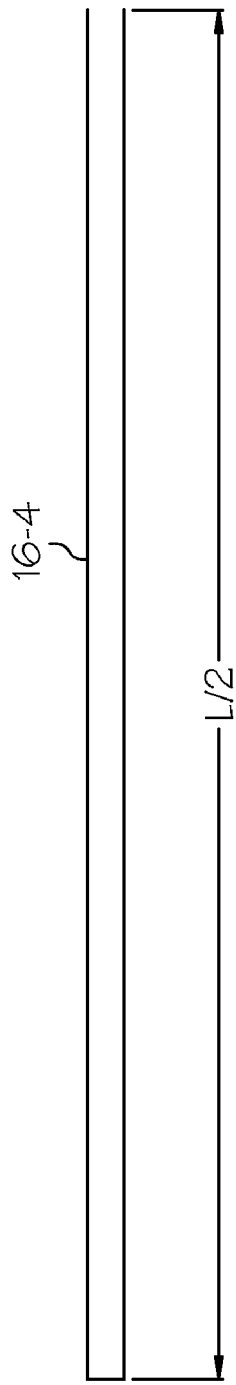
FIG. 5 is a plan view of a shunt resistor in unwound form in accordance with an embodiment of the invention.

The shunt resistor 16-4 may be incorporated directly onto the current transformer 16. A length of resistance wire, e.g., nickel-chromium alloy, may be wound around an outside of the secondary winding 16-2. The resistance wire may be formed from a length L of wire that is folded into a winding length L/2, as shown in FIG. 5. The folded resistance wire may be wound circumferentially in a first direction, e.g., clockwise. Clockwise winding may proceed until half of the L/2 length is on the current transformer 16. Winding may then be performed in an opposite direction e.g., counterclockwise, until virtually the entire shunt resistor 16-4 may be in place on the current transformer. Such a winding pattern may advantageously result in the shunt resistor 16-4 having virtually no inductive effect on operation of the current transformer 16. A small portion of the shunt resistor 16-4 may be left free for use as attachment leads 16-4-2 as seen in FIG. 2.

In an exemplary embodiment of the invention, the shunt resistor 16-4 may be wound on an annular shell 16-6 which may surround the secondary winding 16-2. Uniform winding of the resistance wire may be facilitated if the annular shell 16-6 has a flat exterior winding surface.

Figure 6:
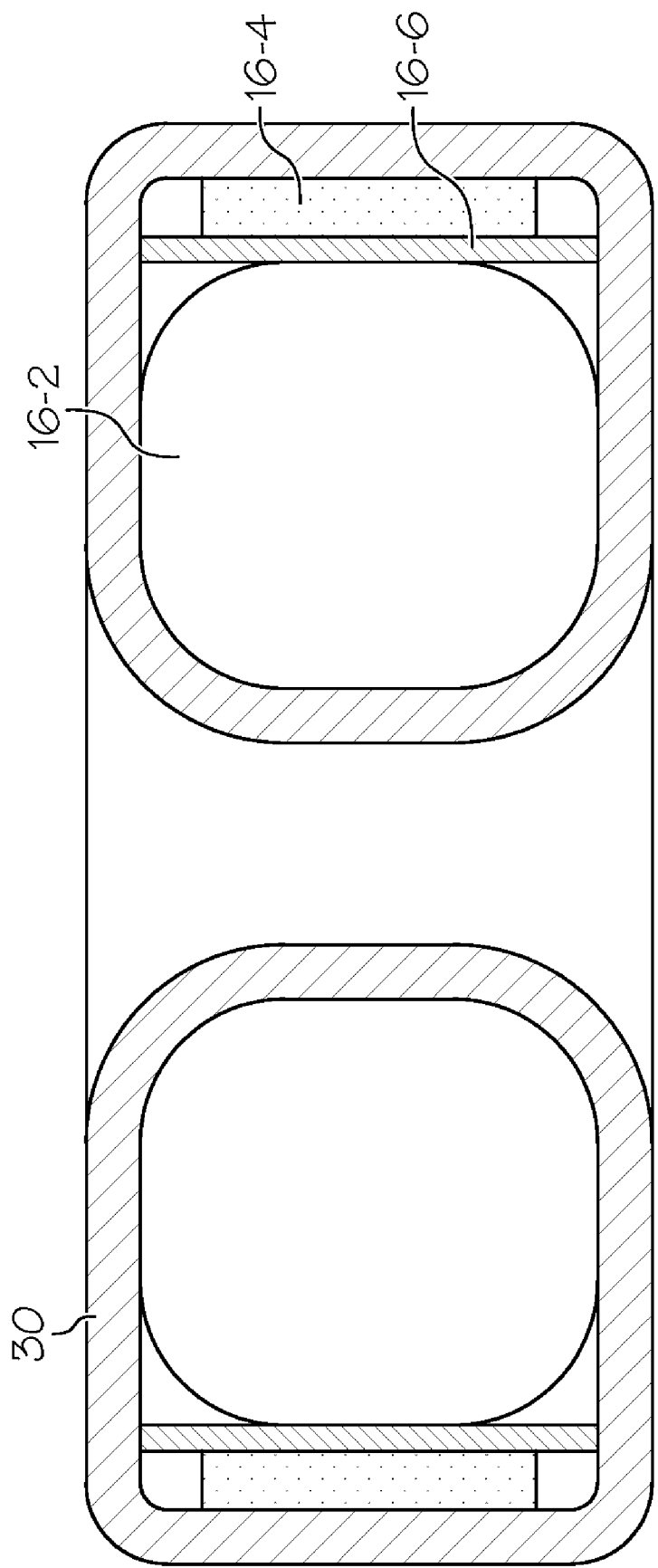
FIG. 6 is a cross-sectional view of a current transformer in accordance with an embodiment of the invention.

Referring now to FIG. 6, it may be seen that the current transformer 16 may be advantageously enclosed with an enclosure 30 that surrounds the shunt resistor 16-4, the annular shell 16-6 and the secondary winding 16-2. The enclosure 30 may comprise heat resistant tape.

It may be noted that when one of the power systems 10 may be employed in an aircraft, an alternate or redundant monitoring system 60 (see FIG. 1) may be provided as an adjunct to the current transformers 16 and 18 and the control circuit 22. The current transformers 16 and 18 and the control circuit 22 may be referred to herein as a primary monitoring system.

Figure 7:
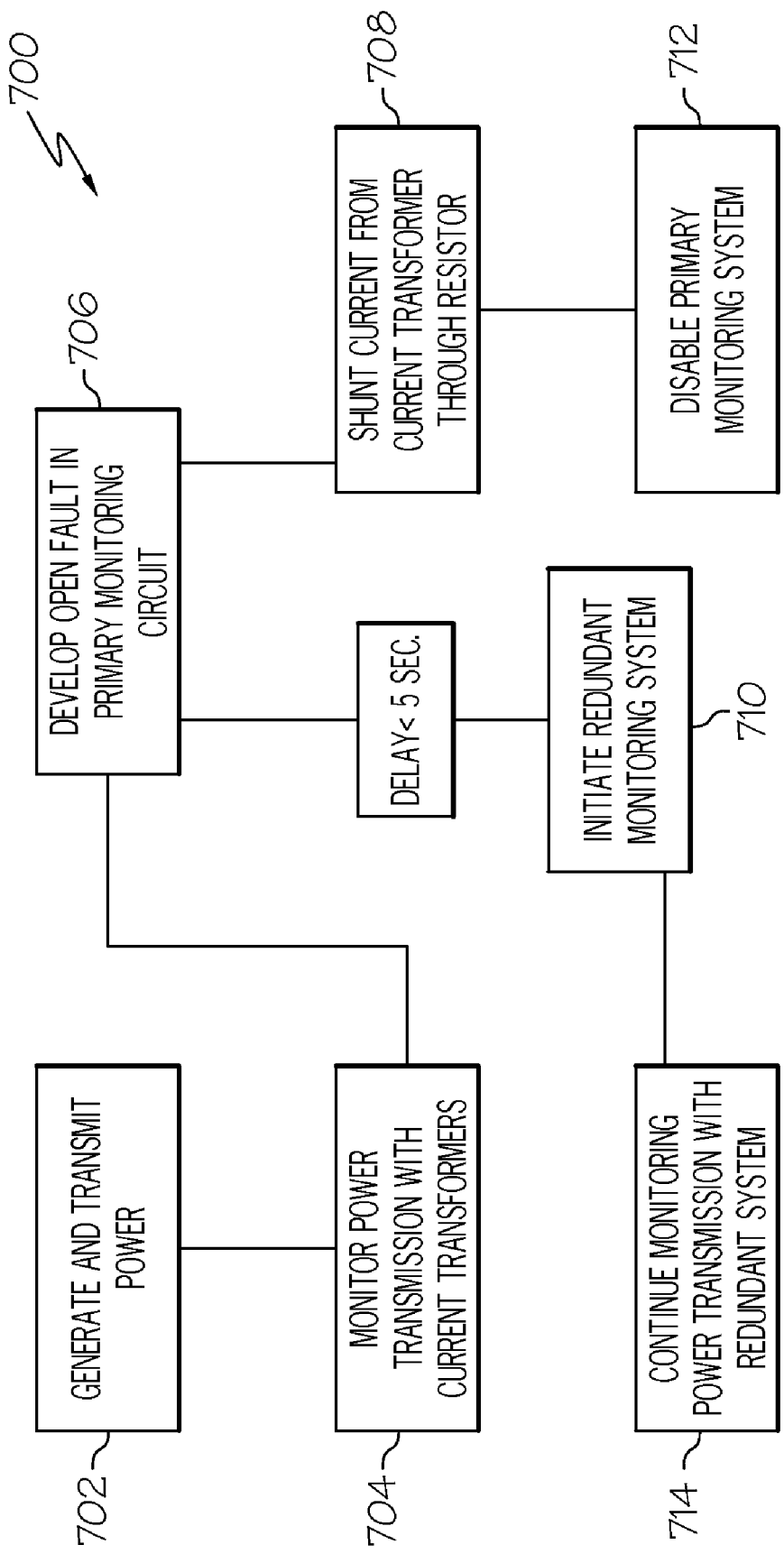
FIG. 7 is a flow chart of a method for operating an electrical system in accordance with an embodiment of the present invention.

Referring now to FIG. 7, a flow chart 700 may illustrate an exemplary method which may be employed to operate the electrical power system 10 in accordance with an embodiment the invention. In a step 702, electric power may be generated and transmitted (e.g., the power source or electric machine 12 may generate electric current and the current may be transmitted along the interconnection path 20 to the electrical loads 14. In a step 704, power transmission may be monitored with current transformers (e.g., the power-source current transformer 16 and the remote current transformer 18 may produce current proportional to current passing though the transformers along the interconnection path 20). In a step 706, an open circuit fault may develop in a primary monitoring circuit (e.g., connection paths 22-2 and/or 22-4 may fail in an open state. or the control circuit 22 may fail in an open state). In a step 708, current from one of the current transformers with the open circuit fault may be passed through an integral shunt resistor (e.g., The shunt resistor 16-4 may allow current from the secondary winding 16-2 of the current transformer 16 to pass and the shunt resistor may provide a finite impedance so that the secondary winding remains undamaged from high voltage failure).

In a step 710, an alternate monitoring system may be initiated prior to expiration of a predetermined time lapse (e.g., In an aircraft power system, the redundant or alternate monitoring system 60 may be activated in the power system 10. The redundant monitoring system 60 may be assigned to perform monitoring during an open circuit failure of the primary control circuit 22. The shunt resistor 16-4 may be configured so that it may tolerate passage of current from the secondary winding 16-2 for the time lapse need to initiate the alternate redundant monitoring system {e.g., at least about 5 seconds} and isolate interconnection path 20, stopping the current flow in this path.). In a step 712, the primary monitoring system may be disabled. In a step 714, the power system may continue operation with the protected zone isolated.

It should be understood, of course, that the foregoing relates to exemplary embodiments of the invention and that modifications may be made without departing from the spirit and scope of the invention as set forth in the following claims.

We claim:

1. An electrical power system comprising:
    an interconnection path between a power source and an electrical load;
    at least one power-source current transformer positioned at the power source;
    at least one remote current transformer positioned remotely from the power-source current transformer so that a portion of the interconnection path is between the power-source current transformer and the remote current transformer;
    a control circuit interposed between the power-source current transformer and remote current transformers and responsive to current imbalance between the power-source current transformer and the remote current transformer to disconnect the power source from the electrical load in the event of such imbalance; and
    wherein the power-source current transformer comprises;
    a secondary winding having first and second ends; and
    a resistor electrically connected across the first and second ends, wherein the resistor comprises wire wound around an outside of the secondary winding.

2. The power system of claim 1: wherein the power source is an electric machine; and
    wherein the power-source current transformer is incorporated in the electric machine.

3. The power system of claim 2 wherein the electric machine is a starter generator of an aircraft.

4. The power system of claim 1 wherein the remote current transformer has a structure that is the same as the power-source current transformer.

5. The power system of claim 1:
    wherein the power-source current transformer has a toroidal configuration; and
    wherein the resistor comprises wire wound around an outer surface of the power-source current transformer.

6. The power system of claim 5:
    wherein the wire has a length L;
    wherein the wire is folded in half to produce a winding length L/2;
    wherein half of the winding length L/2 is wound in a clockwise direction; and
    wherein half of the winding length L/2 is wound in a counterclockwise direction.

7. The power system of claim 1:
    wherein the power system is a multi-phase system; and
    the power system comprises:
    one of the power-source current transformers on each phase; and
    one of the remote current transformers on each phase.

8. A current transformer comprising:
    a secondary winding having a first end and a second end;
    a resistor, comprising resistance wire, electrically interconnected across the first end and the second end of the secondary winding, wherein the resistance wire is wound around an outside of the secondary winding.

9. The current transformer of claim 8 wherein the resistance wire is an alloy of nickel and chromium.

10. The current transformer of claim 8:
    wherein the resistance wire has a length L;
    wherein the resistance wire is folded in half to produce a winding length L/2;
    wherein half of the winding length L/2 is wound in a clockwise direction; and
    wherein half of the winding length L/2 is wound in a counterclockwise direction.

11. The current transformer of claim 8 further comprising:
    an annular shell surrounding the secondary winding;
    wherein the resistance wire is wound on an outer surface of the annular shell so that the annular shell is positioned between the resistance wire and the secondary winding.

12. The current transformer of claim 11 further comprising:
    an enclosure surrounding the secondary winding, the annular shell and the resistance wire; and
    wherein end portions of the resistance wire and the secondary winding project out of the enclosure.

13. The current transformer of claim 12 wherein the enclosure comprises tape wrapping.

14. A method for operating an electrical power system comprising the steps of:
    passing electrical power from a power source to electrical loads through at least one power-source current transformer;
    monitoring current from the power-source current transformer with a control circuit;
    passing current from a secondary winding of the current transformer through a shunt resistor in the event of an open circuit fault in the control circuit or an open circuit fault in an interconnection path between the secondary winding and the control circuit; and
    activating an alternate monitoring system in the power system in the event of the open fault;
    wherein the step of passing current through the shunt resistor is sustained for a time period sufficient to permit the activation of the alternate monitoring system; and
    de-activating the control circuit after the time period.

15. The method of claim 14 further comprising the step of passing the electrical power through at least one remote current transformer.

16. The method of claim 15 further comprising the steps of:
    monitoring current from the at least one remote current transformer with the control circuit; and
    stopping current flow between the power source and the electrical loads in the event of an imbalance of current between the at least one power-source current transformer and the at least one remote current transformer.

17. The method of claim 16 wherein the step of passing current through the shunt resistor is performed for a time period of at least 5 seconds.

* * * * *